(12) United States Patent
Chiang

(10) Patent No.: US 6,869,531 B2
(45) Date of Patent: Mar. 22, 2005

(54) FLUID FILTER

(76) Inventor: Charles N. Chiang, 520 Kingsford St., Monterey Park, CA (US) 91754

( * ) Notice: Subject to any disclaimer, the term of this patent is extended or adjusted under 35 U.S.C. 154(b) by 160 days.

(21) Appl. No.: 10/279,235

(22) Filed: Oct. 25, 2002

(65) Prior Publication Data

US 2004/0079697 A1 Apr. 29, 2004

(51) Int. Cl.$^7$ .................................................. C02F 1/40
(52) U.S. Cl. ..................... 210/242.3; 210/307; 210/514; 210/470; 99/496; 99/508; 30/325
(58) Field of Search ............................ 210/776, 242.3, 210/299, 307, 514, 470; 99/495, 496, 506, 508; 30/324, 325

(56) References Cited

U.S. PATENT DOCUMENTS

| | | | | |
|---|---|---|---|---|
| 2,575,768 A | * | 11/1951 | Pearsall ...................... | 210/513 |
| 2,795,119 A | * | 6/1957 | Bair ............................ | 30/325 |
| 3,326,384 A | * | 6/1967 | Wessels ...................... | 210/470 |
| 3,392,845 A | * | 7/1968 | Shapiro et al. ............. | 210/470 |
| 5,084,177 A | * | 1/1992 | Keene ........................ | 210/514 |
| 5,510,028 A | * | 4/1996 | Kuhlman .................... | 210/514 |
| 5,526,737 A | * | 6/1996 | Betzen ........................ | 99/496 |
| 5,560,109 A | * | 10/1996 | Lam ............................ | 30/325 |
| 6,443,313 B1 | * | 9/2002 | Uli ............................. | 210/470 |

\* cited by examiner

*Primary Examiner*—Christopher Upton
(74) *Attorney, Agent, or Firm*—Raymond Y. Chan; David and Raymond

(57) ABSTRACT

A fluid filter, which is adapted for separating a less dense fluid floating on a high dense fluid, includes at least a fluid filtering arrangement including a floating wing adapted for floating on the less dense fluid and at least a fluid outlet formed on the floating wing, and a container body, which is extended from the floating wing, having a fluid collecting cavity communicating with the fluid outlet, wherein the fluid outlet is formed at a position above the fluid collecting cavity. Therefore, when a downward force is applied on the floating wing until the fluid outlet is slightly positioned below the surface level of the less dense fluid, the less dense fluid is allowed to flow into the fluid collecting cavity through the fluid outlet by gravity.

12 Claims, 8 Drawing Sheets

FLUID FILTER

BACKGROUND OF THE PRESENT INVENTION

1. Field of Invention

The present invention relates to a fluid separating device, and more particularly to a fluid filter which is capable of effectively separating a less dense fluid floating on a high dense fluid in accordance with the Pascal's law.

2. Description of Related Arts

Due to the physical properties, when two fluids having different densities, the fluid having less density floats on top of the fluid having high density, such as oil and water. However, no particular hand tool is available to effectively separate the two different fluids.

For example, people would like order a soup while they are taking their meal since the soup contains all the nutrition of the ingredients and is easy to digest. However, while making the soup, not only the nutrition from the ingredients is dissolved in the soup but also the fat is squeezed out from the ingredients. Since the fat, especially the fat from the meat, is bad for your health, people would like to remove the fat or the grease from the soup before they take the soup. However, there is no particular tool for the chef to remove the grease from the soup.

Since the density of the grease is lesser than the density of the soup, the grease will float on top of the soup. People would like to use a spoon to spoon up the grease from the soup. However, while spooning up the grease, it is unavoidable to spoon up the soup as well. Moreover, such method wastes lots of time for the chef to spoon up the grease little by little from a big soup kettle. Once the soup is stirred by the spoon, the grease is broken down and dissolves back into the soup in such a manner that the chef must wait until the grease gathers and reforms and floats on the soup for collecting purpose. Furthermore, the ingredients may enter into a cavity of the spoon at the entrance edge thereof while spooning up the grease.

Therefore, most people will merely pour out the top portion of the soup in order to get rid of the grease. However, not only the grease but also large portion of the soup is drained away at the same time, such that it is a waste of the soup while the chef spends lots of time to prepare the soup.

An alternative method is to put the kettle or bowl of soup in the refrigerator such that the grease is condensed to be hardened. Therefore, the chef can easily spoon up the grease. However, it takes more time to freeze and re-heat the soup before the soup is ready for serving. Thus, the taste of the soup will be destroyed by the re-heating process and is not as good as it is freshly cooked, especially vegetable ingredients and some meat or poultry color and taste, not to mention the nutrition value, will be changed or even destroyed after re-cook.

SUMMARY OF THE PRESENT INVENTION

A main object of the present invention is to provide a fluid filter which capable of quickly and effectively separating a less dense fluid floating on a high dense fluid in accordance with the Pascal's law. For example, only an upper layer of the soup, i.e. the grease, is collected by the fluid filter.

Another object of the present invention is to provide a fluid filter, wherein due to the physical properties of the less dense fluid that floats on top of the high dense fluid, a fluid filtering arrangement of the fluid filter is arranged to float on the less dense fluid for collecting the less dense fluid to the fluid collecting cavity from the high dense fluid, so as to prevent the high dense fluid being collected by the fluid filtering arrangement.

Another object of the present invention is to provide a fluid filter, wherein the fluid filter is capable of being used for removing the grease from the soup, so as to enhance the cooking speed since the grease is removed and collected during cooking process. In other words, the user does not have to cool down or even freeze the soup for removing the grease.

Another object of the present invention is to provide a fluid filter, wherein when the fluid filter is used as a grease removing tool for cooking, no grease is remained on the soup so as to lower the boiling point of the soup. In other words, no energy is wasted to heat up the grease during cooking.

Another object of the present invention is to provide a fluid filter, wherein a fluid outlet of the fluid filtering arrangement is positioned above the fluid collecting cavity in such a manner that the less dense fluid is flowed into the fluid collecting cavity through fluid outlet by gravity. In other words, no suction mechanism is required to incorporate with the present invention.

Another object of the present invention is to provide a fluid filter, wherein any substance floats either on the less dense fluid or the high dense fluid is blocked to flow into the fluid collecting cavity. In other words, only the less dense fluid is allowed to flow into and collect in the fluid collecting cavity. Therefore, for example, the ingredients in the soup are blocked by the fluid filter such that only the grease is collected in the fluid collecting cavity.

Another object of the present invention is to provide a fluid filter, wherein the collection operation of the fluid filter is simple that every individual is able to operate the present invention without complicated instruction.

Another object of the present invention is to provide a fluid filter, wherein no expensive or complicated structure is required to employ in the present invention in order to achieve the above mentioned objects. Therefore, the present invention successfully provides an economic and efficient solution to separate and collect the less dense fluid from the high dense fluid.

Accordingly, in order to accomplish the above objects, the present invention provides a fluid filter for separating a less dense fluid floating on a high dense fluid, comprising:

at least a fluid filtering arrangement comprising a floating wing adapted for floating on the less dense fluid, and having at least a fluid outlet formed on the floating wing; and a container body, which is extended from the floating wing, having a fluid collecting cavity communicating with the fluid outlet, wherein the fluid outlet is formed at a position above the fluid collecting cavity, thereby, when a downward force is applied on the floating wing until the fluid outlet is slightly positioned below a surface level of the less dense fluid, the less dense fluid is allowed to flow into the fluid collecting cavity through the fluid outlet by gravity.

DETAILED DESCRIPTION OF THE PREFERRED EMBODIMENT

Figure 1:
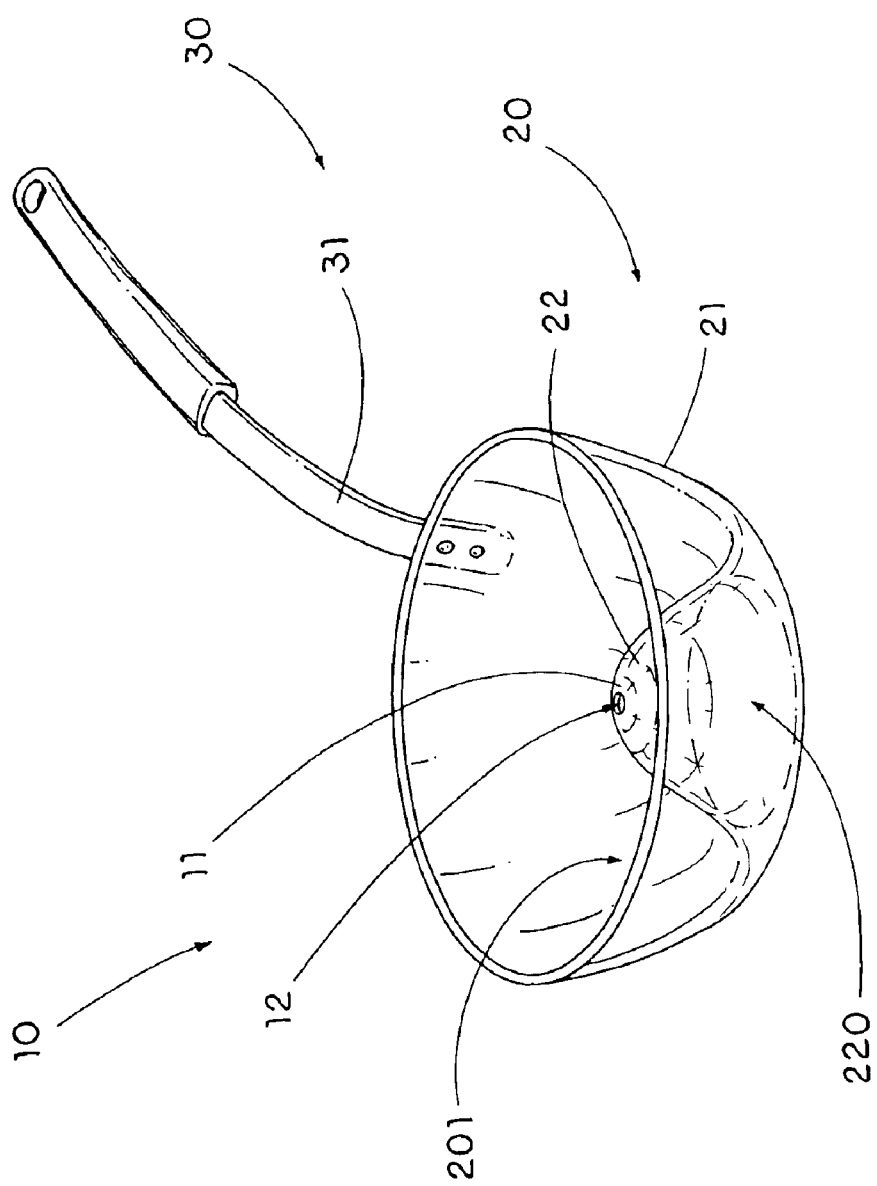
FIG. 1 is a perspective view of a fluid filter according to a first preferred embodiment of the present invention.
Figure 2A:
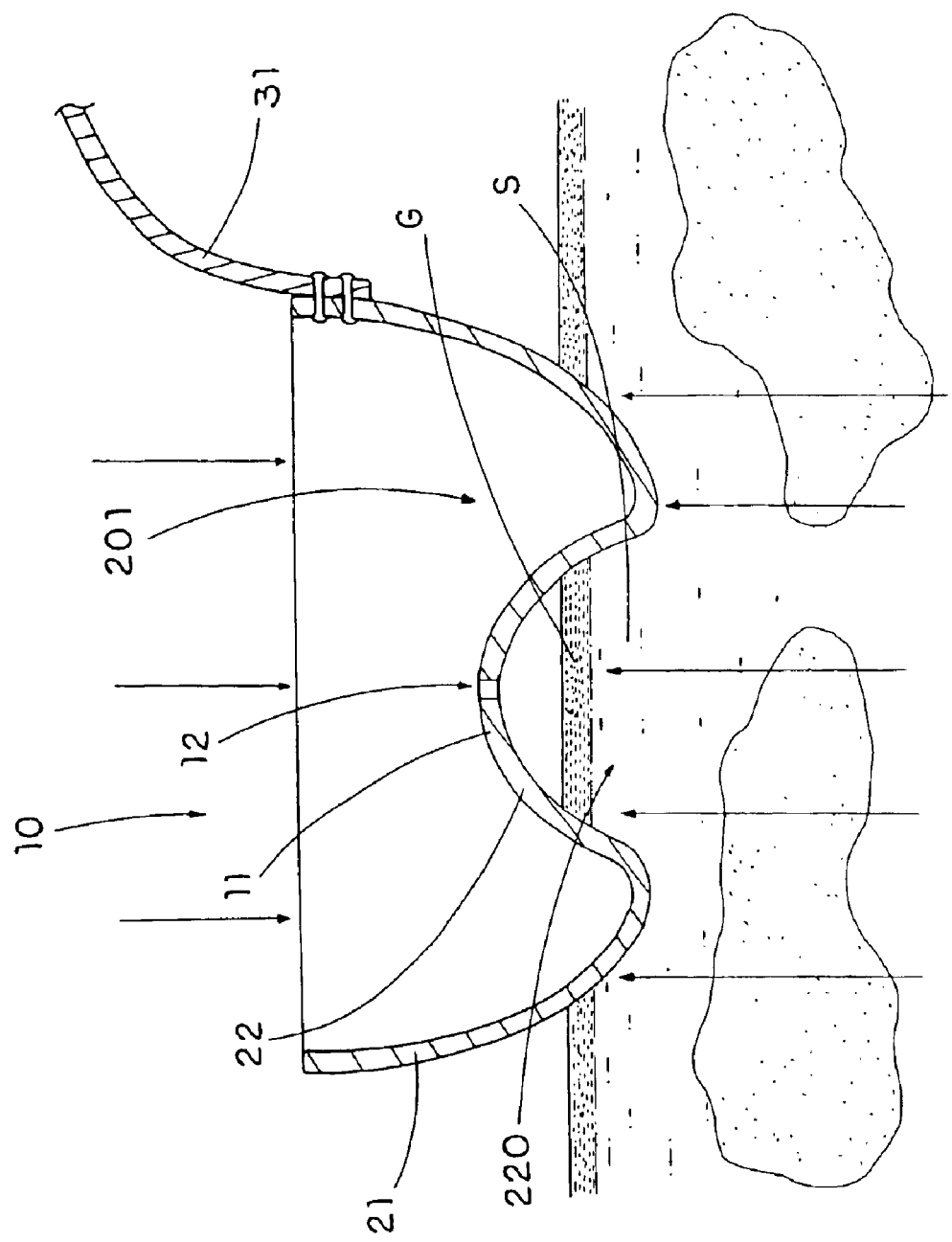
FIGS. 2A and 2B are sectional views of the fluid filter according to the above first preferred embodiment of the present invention.

Referring to FIGS. 1 and 2A of the drawings, a fluid filter according to a first preferred embodiment of the present invention is illustrated, wherein the fluid filter is capable of quickly and effectively separating a less dense fluid from a high dense fluid while the less dense fluid floats on the high dense fluid.

According to the preferred embodiment, the fluid filter is capable of separating and collecting the less dense fluid from the high dense fluid wherein the less dense fluid is embodied as a grease G and the high dense fluid is embodied as a soup S since the grease G floats on top of the soup S.

As shown in FIG. 1, the fluid filter comprises at least a fluid filtering arrangement 10 comprising a floating wing 11 adapted for floating on the grease G and having at least a fluid outlet 12 formed on the floating wing 11, and a container body 20, which is extended from the floating wing 11, having a fluid collecting cavity 201 communicating with the fluid outlet 12 wherein the fluid outlet 12 is formed at an apex above the fluid collecting cavity 201. Therefore, when a downward force is applied on the floating wing 11 until the fluid outlet 12 is slightly positioned below the surface level of the grease G, the grease G is allowed to flow into the fluid collecting cavity 201 through the fluid outlet 12 by gravity.

According to the preferred embodiment, the container body 20 comprises an outer surrounding wall 21 and an inner surrounding wall 22, which defines an inner receiving cavity 220, integrally extended from the outer surrounding wall 21 at a bottom edge thereof to form the fluid collecting cavity 201 therebetween, wherein the floating wing 11 is extended from an upper end portion of the inner surrounding wall 22 in such a manner that the fluid collecting cavity 201 is communicated with the inner receiving cavity 220 through the fluid outlet 12 for allowing the grease G within the inner receiving cavity 220 flowing into the fluid collecting cavity 201 through the fluid outlet 12.

The inner surrounding wall 22 is formed as a hollow conical shape such that the inner receiving cavity 220 has a cross sectional area gradually reducing towards a peak thereof, wherein the fluid outlet 12 is formed at the peak of the inner surrounding wall 22. As shown in FIG. 2A, the outer surrounding wall 21 has a height higher than a height of the inner surrounding wall 22 in such a manner that when the fluid outlet 12 is moved slightly below the surface level of the grease G for allowing the grease G flowing through the fluid outlet 12, a top edge of the outer surrounding wall 21 is positioned above the surface level of the grease G, so that the outer surrounding wall 21 is capable of retaining the grease G within the fluid collecting cavity 201 so as to prevent the grease G leaking therefrom.

The container body 20 has a bottom curved surface formed by the outer and inner surrounding walls 21, 22 wherein the bottom curved surface of the container body 20 is adapted for guiding the grease G and the soup S flowing into the inner receiving cavity 220 while the downward force is applied on the container body 20. In other words, when the container body 20 is pressed downwardly, the soup S with the grease G is forced to either flow to an exterior of the outer surrounding wall 21 or into the inner receiving cavity 220, so as to prevent the grease G staying at the bottom side of the container body 20. Furthermore, the outer surrounding wall 21 of the container body 20 forms a boundary to traps a predetermined amount of grease G and soup S within the inner receiving cavity 220, so that the grease G floated on the of the soup S and trapped within the inner receiving cavity 220 has no where to go and will all enter the collecting cavity 201 through the only exit of the inner receiving body 20, i.e. the fluid outlet 12.

Figure 2B:
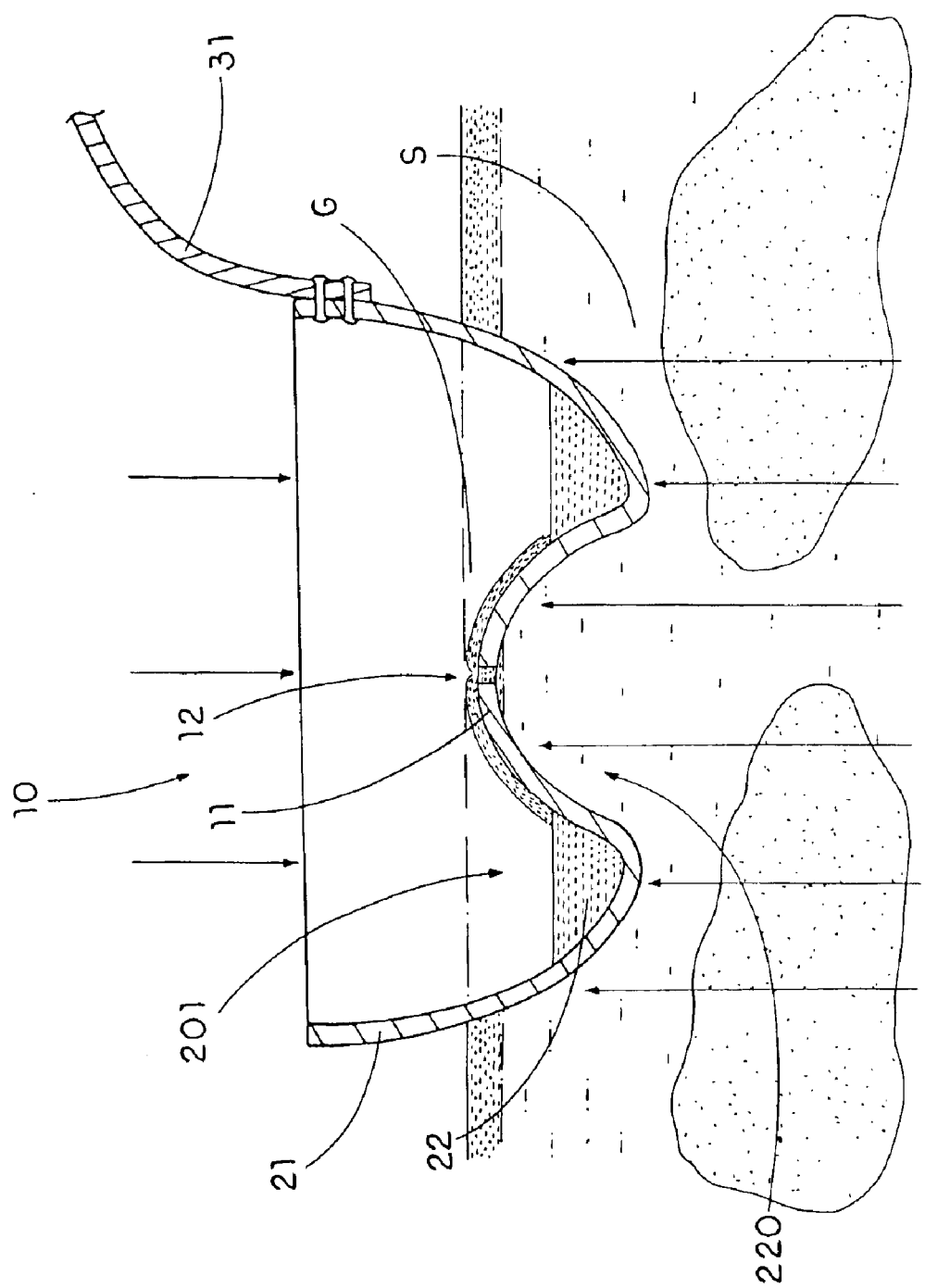

In accordance with the Pascal's law, the pressure in a fluid is the same at all points having the same elevation, wherein the shape of the container does not affect the pressure. Since the pressure of the soup S within the inner receiving cavity 220 is the same as the pressure of the soup S at an exterior of the container body 20, when the floating wing 11 is floated on top of the soup S, the soup S within the inner receiving cavity 220 having the same surface level of the grease G at the exterior of the outer surrounding wall 21, as shown in FIG. 2A. Therefore, when the floating wing 11 is pressed downwardly until the fluid outlet 12 is positioned slightly below the surface level of the grease G within the inner receiving cavity 220, the pressure of the soup S is reacted to exert upwardly with respect to the floating wing 11, so as to push the grease G floating on the soup S out of the inner receiving cavity 220 to the fluid collecting cavity 201 through the fluid outlet 12, as shown in FIG. 2B.

Due to the conical shape of the inner receiving cavity 220, the pressure of the soup S therewithin is substantially increased by reducing the cross sectional area of the inner receiving cavity 220 when the container body 20 is pressed downwardly, so as to effectively squeeze the grease G out of the inner receiving cavity 220 to the fluid collecting cavity 201 through the fluid outlet 12.

As shown in FIG. 1, the fluid filter further comprises a control member 30 upwardly extended from the container body 20 to control the downward movement of the floating wing 11 so as to adjust a position of the fluid outlet 12 with respect to the surface level of the grease G. Accordingly, the control member 30 is embodied as a handle 31 radially extended from the outer surrounding wall 21 of the container body 20, in such a manner that the user is able to hold the handle 31 of the control member 30 to press and lift the floating wing 11 slightly below and above the surface level of the grease G respectively.

In addition, since the fluid outlet 12 is sized for allowing the soup S and the grease G flowing from the inner receiving cavity 220 to the fluid collecting cavity 201 and for blocking any substance, such as the ingredients, in the soup S and the grease G entering into the fluid collecting cavity 201 so as to further filter the substance in the soup S and the grease G. In other words, only the grease G is allowed to be collected in the fluid collecting cavity 201 so as to substantially separate the grease G from the soup S.

In order to operate the fluid filter of the present invention, the user is able to place the container body 20 on the soup S while the floating wing 11 floats on the grease G and the soup S with the grease G is enclosed within the inner receiving cavity 220. Then, the user is able to apply a downward pressing force on the container body 20 via the handle 31 of the control member 30, so as to force the floating wing 11 downwardly below the surface level of the grease G. Once the fluid outlet 12 is positioned below the surface level of the grease G, the pressure of the soup S within the inner receiving cavity 220 push the grease G releasing therefrom to the fluid collecting cavity 201 through the fluid outlet 12.

By observation, when the grease G within the inner receiving cavity 220 is squeezed to flow into the fluid collecting cavity 201 by gravity, the user is able to lift up the container body 20 via the handle 31 until the fluid outlet 12 is positioned above the surface level of the grease G, so as to prevent the soup S within the inner receiving cavity 220 dispensing to the fluid collecting cavity 201. In other words, only the grease G is separated from the soup S to the fluid collecting cavity 201, so as to minimize the waste of the soup S. Therefore, the user is able to repeat the up and down movement of the fluid filter until desired amount of grease G is removed from the soup S.

It is worth to mention that the fluid filter of the present invention can effectively remove the grease G from the soup during cooking, such that the cooking time can be substantially reduced since no time is wasted for cooling down the soup until the grease G is condensed. Moreover, once the grease G is removed during cooking, no additional energy is required to heat up the grease G.

In other words, the fluid filter of the present invention can separate a first fluid from a second fluid that has a density higher than the first fluid through the steps of:

(a) trapping a portion of soup having some grease floating thereon within the inner receiving cavity defined by the floating wing 11 of the body container 20;

(b) slowing pushing down the body container 20 to reduce the volume of the inner receiving cavity 220 so as to gather the grease floating on the trapped portion of soup to an upper portion of the inner receiving cavity 220 to pass through the fluid outlet 12 into the fluid collecting cavity 201 of the container body until all trapped grease is collected in the fluid collecting cavity 201, i.e. when the trapped soup starts to pass through the fluid outlet 12 into the fluid collecting cavity 201; and (c) repeating the step (a) and (b) until all grease G is separated from the soup S.

Figure 3:
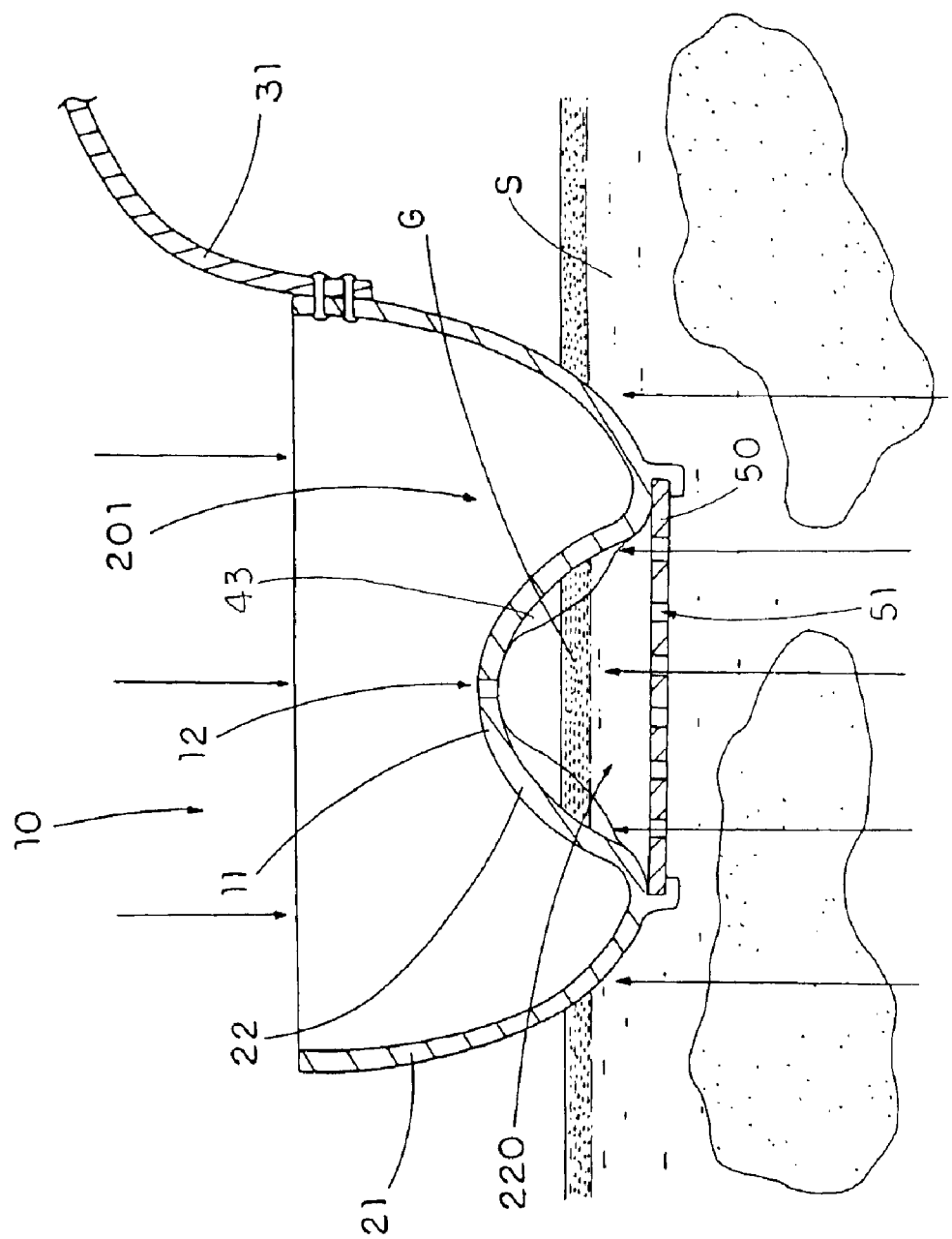
FIG. 3 illustrates the fluid filter incorporated with a substance guide according to a first alternative mode of the above first preferred embodiment of the present invention.

As shown in FIG. 3, a first alternative mode of the fluid filter according to the above preferred embodiment further comprises a substance guide 50 mounted underneath the container body 20 at a bottom opening of the inner receiving cavity 220 wherein the substance guide 50 has a plurality of guiding meshes 51 sized for allowing the soup S and the grease G flowing into the inner receiving cavity 220 and blocking substance, such as the ingredients, floating on the soup S and the greases G entering into the inner receiving cavity 220, so as to prevent the fluid outlet 12 being stuck by the substance.

Figure 4:
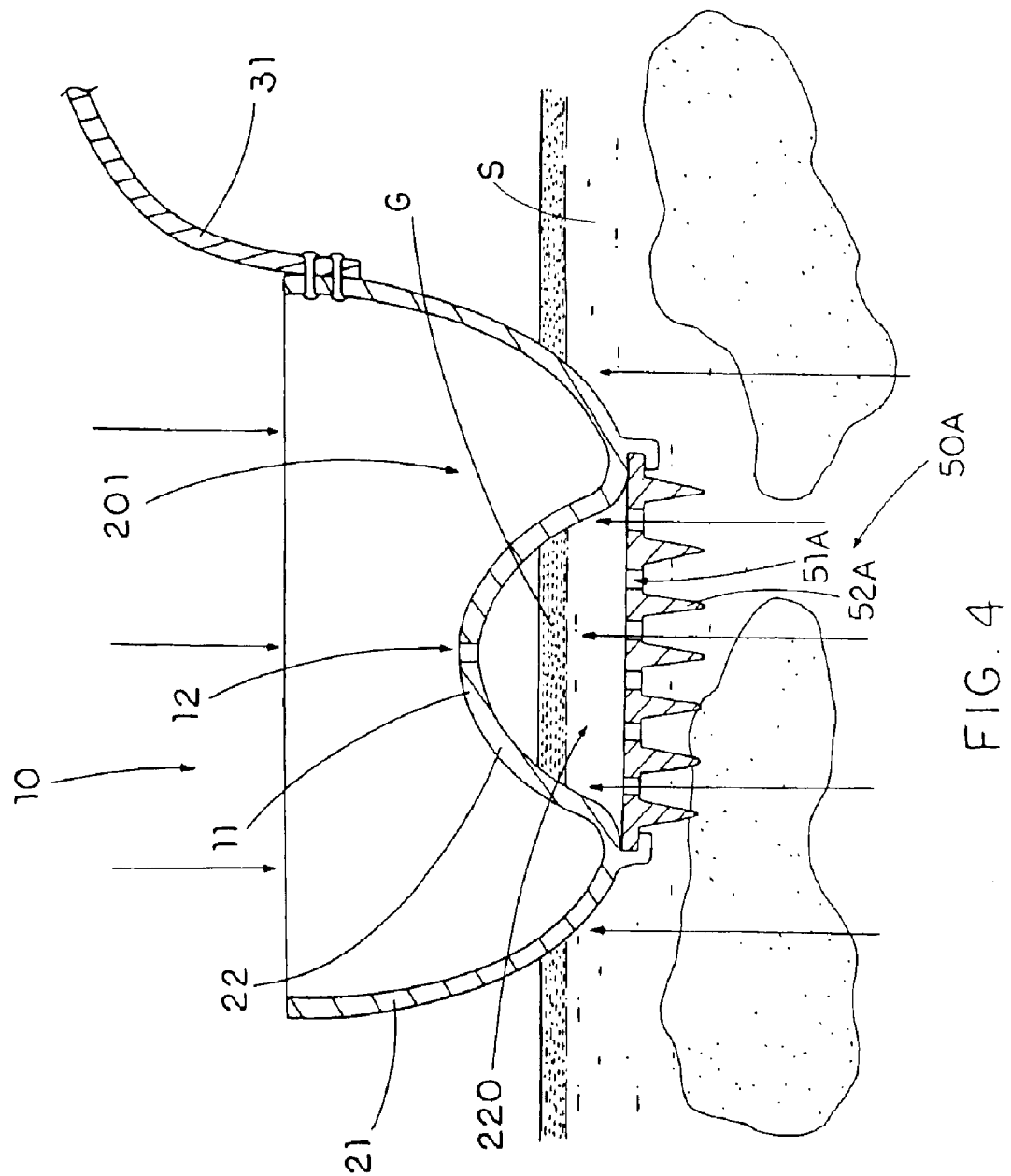
FIG. 4 illustrates an alternative substance guide of the fluid filter according to the first alternative mode of above first preferred embodiment of the present invention.

FIG. 4 illustrates an alternative mode of the substance guide 50A having a plurality of guiding meshes 51A sized for allowing the soup S and the grease G flowing into the inner receiving cavity 220 and comprising a plurality of prongs 52A extended downwardly for pressing the substance floating on the soup S and the grease G so as to block the substances sticking on the guiding meshes 51A. In other words, the prongs 52A is capable of breaking away the grease G trapped in the substance, such as the meat, and keeping the substance away from the guiding meshes 51A. Therefore, the grease G floated on the soup S and trapped in the substance can enter into the inner receiving cavity 220 through the meshes 51A for collection purpose.

Figure 5:
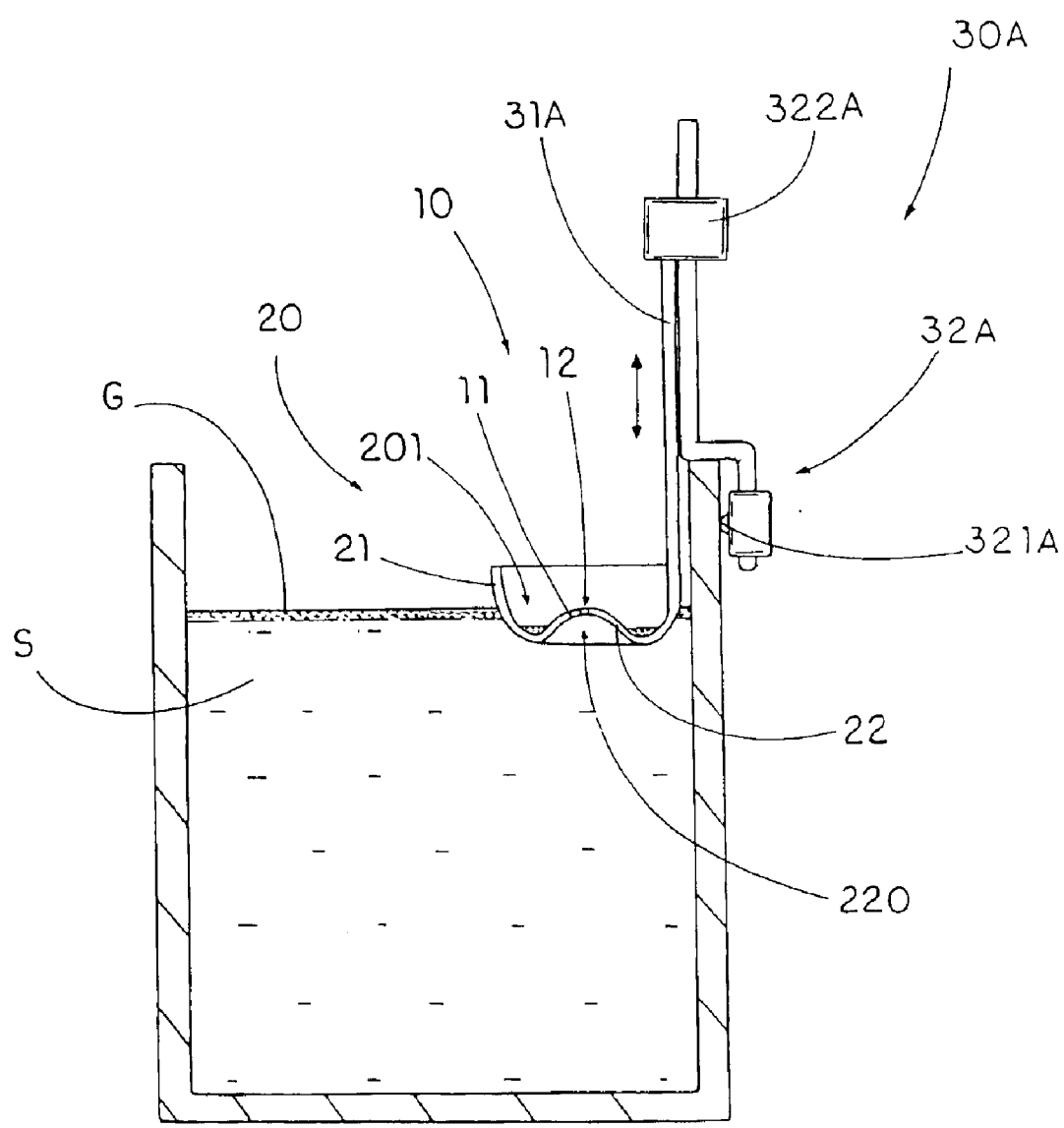
FIG. 5 illustrates a second alternative mode of a control member of the fluid filter according to the above first preferred embodiment of the present invention.

FIG. 5 illustrates a second alternative mode of the above preferred embodiment, wherein the control member 30A comprises a retractable arm 31A having a lower control portion extended from the outer surrounding wall 21 of the container body 20 and an upper hanging portion adapted for hanging on an top opening edge of a fluid container (kettle) at a position that the floating wing 11 floats on the grease G, and means 32A for slidably driving the hanging portion of the retractable arm 31A along the top opening edge of the soup pot so as to move the container body 20 on the soup S.

Accordingly, the retractable arm 31A is adapted to be selectively adjusted a distance between the control portion and hanging portion such that when the retractable arm 31A is hung on the top opening edge of the soup pot, the floating wing 11 is suspendedly supported to float on the grease G while the fluid outlet 12 is positioned slightly below the surface level of the grease G, so as to allow the grease G within the inner receiving cavity 220 flowing out to the fluid collecting cavity 201 through the fluid outlet 12.

The driving means 32A comprises a first rotor 321A rotatably mounted to the hanging portion of the retractable arm 31A to slidably move along the top opening edge of the kettle and a second rotor 322A operatively mounted on the retractable arm 31A to drive the container body 20 in a vertically movable manner with respect to the surface level of the grease G. Therefore, the container body 20 is driven to vertically move on surface level of the grease G to collect the soup S with the grease G in the inner receiving cavity 220, so as to collect grease G to the fluid collecting cavity 201 through the fluid outlet 12. In other words, the fluid filter can automatically collect the grease G on the soup S by moving the container body 20 on the soup S via the control member 30A.

For enhancing the grease collecting process, the user is able to place the soup pot in an inclined manner wherein the grease G accumulatively floats on the soup S at one side of the soup pot in such a manner that when container body 20 is moved to the corresponding side of the soup pot where the grease G is accumulated therewithin, a large amount of grease G is flowed through the fluid outlet 12 and collected in the fluid collecting cavity 201.

It is worth mentioning that more than one fluid outlet 12 can be spacedly formed on the floating wing 11 such that when the floating wing 11 is pressed below the surface level of the grease G, the grease G can flow to the fluid collecting cavity 201 through the fluid outlets 12, so as to enhance the grease separating operation from the soup S. Moreover, more than one inner surrounding wall 22 can be formed within the outer surrounding wall 21, wherein the fluid outlet 12 is formed on top of each of the inner surrounding walls 22 to communicate with the respective inner receiving cavity 220 thereof. Therefore, more amount of soup S with grease G is enclosed within the inner receiving cavity 220 so as to speed up the grease separating process of the fluid filter of the present invention.

Figure 6:
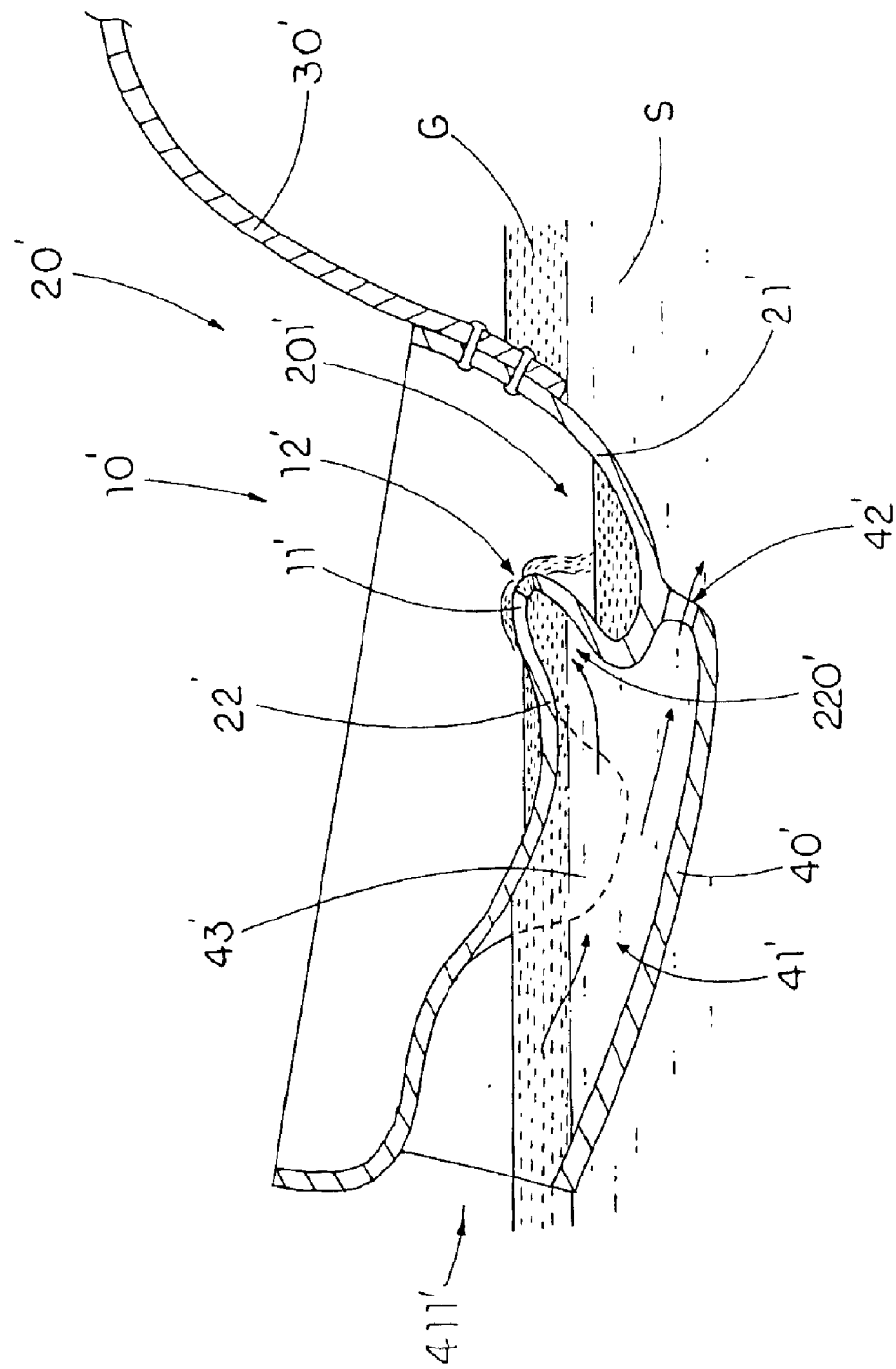
FIG. 6 is a longitudinal sectional view of a fluid filter according to a second preferred embodiment of the present invention.

As shown in FIG. 6, a fluid filter of a second embodiment illustrates an alternative mode of the first embodiment, wherein the fluid filter comprises at least a fluid filtering arrangement 10' comprising a floating wing 11' adapted for floating on the grease G and having at least a fluid outlet 12' formed on the floating wing 11', and a container body 20', which is extended from the floating wing 11', having a fluid collecting cavity 201' communicating with the fluid outlet 12' wherein the fluid outlet 12' is formed at a position above the fluid collecting cavity 201'.

The container body 20' comprises an outer surrounding wall 21' and an inner surrounding wall 22', defining an inner receiving cavity 220', integrally extended from the outer surrounding wall 21' at a bottom edge thereof to form the fluid collecting cavity 201' therebetween, wherein the floating wing 11' is extended from an upper end portion of the inner surrounding wall 22' in such a manner that the fluid collecting cavity 201' is communicated with the inner receiving cavity 220' through the fluid outlet 12' for allowing the grease G within the inner receiving cavity 220' to flow into the fluid collecting cavity 201'.

The fluid filter further comprises a fluid guider 40' extended from the outer surrounding wall 22' to a position underneath the container body 20' to form a fluid guiding channel 41', having a fluid entrance 411', between the fluid guider 40' and a bottom side of the container body 20' to communicate with the inner receiving cavity 220', wherein when the floating wing 11' floats on the grease G, the soup S with the grease G is guided to flow into the inner receiving cavity 220' from the fluid entrance 411' through the fluid guiding channel 41'.

As shown in FIG. 6, the fluid guider 40' further has a fluid exit 42' provided thereon for communicating with the guiding channel 41', wherein the fluid exit 42' allows the soup S exiting from the guiding channel 41' to outside in such a manner that large amount of soup S and grease G can be entered into the guiding channel 41' while the grease G is collected within the fluid collecting cavity 201' through fluid outlet 12' and the soup S is flowed to outside through the fluid exit 42', so as to balance the flow of the soup S.

Figure 7:
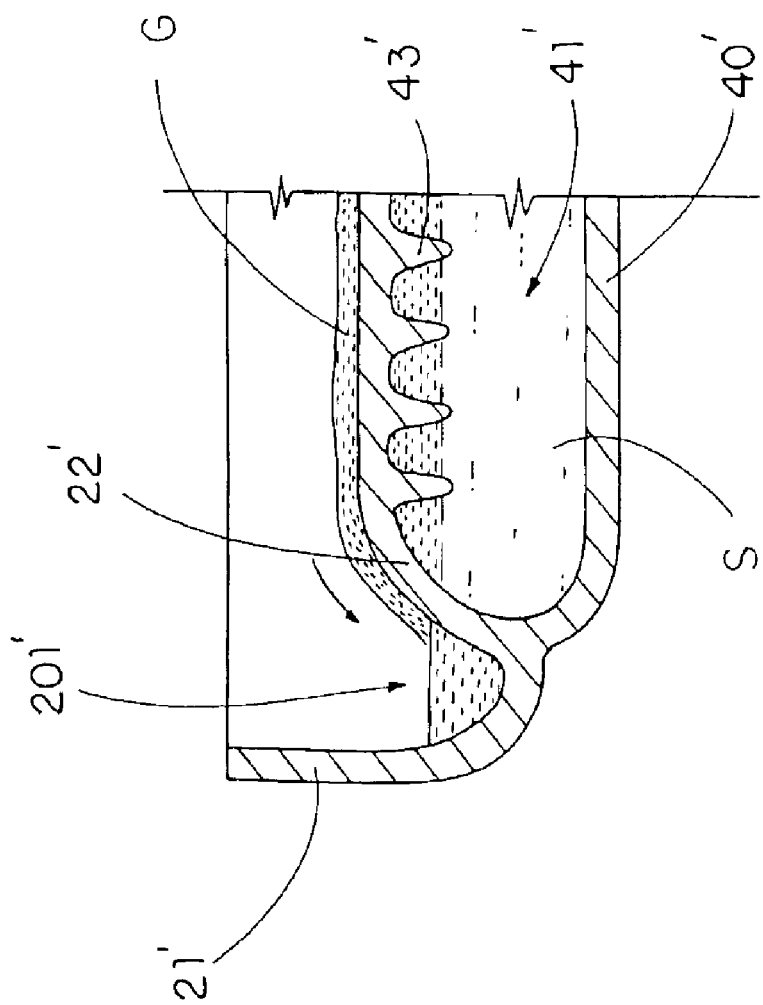
FIG. 7 is a transverse sectional view of the fluid filter according to the above second preferred embodiment of the present invention.

In addition, both the above first alternative mode as shown in FIG. 3 and the second preferred embodiment as shown in FIG. 7, the fluid guider 40, 40' further comprises a plurality of guiding fins 43, 43' spacedly and downwardly extended from the bottom side of the container body 20, 20' for guiding the soup S and grease G flowing towards the inner receiving cavity 220, 220'. As shown in FIG. 7, the soup S and grease G is further guided to flow towards the inner receiving cavity 220' through the guiding channel 41'.

It is worth to mention that the guiding fins 43, 43' are adapted for stabilizing the flow of the soup S and grease G within the inner receiving cavity 220 or the guiding channel 41' so as to ensure the grease G floats on top of the soup S. Therefore, the grease G is guided to enter into the inner receiving cavity 220, 220' so as to efficiently remove the grease G on the soup S. In addition, the guiding fins 43, 43' also function as an ostracizer to the soup S for keeping the soup down and retaining flow of grease G tightening to the top layer of flow simultaneously so as to lead grease flow flowing through fluid outlet 12, 12' into the collecting cavity 201, 201'.

The fluid filter further comprises a control member 30' upwardly extended from the outer surrounding wall 21' of the container body 20' to not only control the downward movement of the floating wing 11' so as to guide the grease G flowing to the fluid collecting cavity 201' through the fluid outlet 12' but also the forward movement of the container body 20' so as to guide the soup S with the grease G flowing into the fluid guiding channel 41' through the fluid entrance 411'.

In order to operate the fluid filter, the user is able to move the container body 20' on the surface level of the grease G via the control member 30' to guide the soup S entering into fluid guiding channel 41' through the fluid entrance 411' so as to collect the grease G within the inner receiving cavity 220'. Then, by downwardly pressing the floating wing 11' via the control member 30' until the fluid outlet 12' is positioned slightly below the surface level of the grease G, the grease G within the inner receiving cavity 220' is flowed out to the fluid collecting cavity 201' through the fluid outlet 12'. By observation, when the grease G is flowed out from the inner receiving cavity 220', the container body 20' is lifted up that the fluid outlet 12' is positioned above the surface to level of the grease G so as to stop the soup S flowing to the fluid collecting cavity 201'.

It is worth mentioning that when the soup S is entered into the fluid guiding channel 41' through the fluid entrance 411', the grease G is stayed in the fluid guiding channel 41' and the inner receiving cavity 220'. Therefore, even the soup S is stirred to break down the grease G, the grease G is trapped within the fluid guiding channel 41'. In other words, the grease G can be substantially collected within the fluid guiding channel 41' and separated from the soup S to the fluid collecting cavity 201'.

In view of above, the fluid filter can substantially separate the less dense fluid from the high dense fluid by using their physical properties and collect the less dense fluid from the high dense fluid into the fluid collecting cavity. In addition, the fluid filter of the present invention can be applied for separating the motor oil or crude oil from the water since the motor oil or crude oil having lesser density floats on top of the water.

What is claimed is:

1. A fluid filter for separating a less dense fluid from a high dense fluid while said less dense fluid floats on said high dense fluid, comprising:

at least a fluid filtering arrangement comprising a floating wing adapted for floating on said less dense fluid, and having at least a fluid outlet formed on said floating wing;

a container body, which is extended from said floating wing, having a fluid collecting cavity communicating with said fluid outlet, wherein said fluid outlet is formed at a peak of said fluid collecting cavity, wherein said container body comprises an outer surrounding wall and an inner surrounding wall, having an inner receiving cavity, integrally extended from said outer surrounding wall at a bottom edge thereof to form said fluid collecting cavity therebetween, wherein said floating wing is extended from an upper end portion of said inner surrounding wall such that said fluid collecting cavity is communicated with said inner receiving cavity through said fluid outlet for allowing said less dense fluid within said inner receiving cavity flowing into sad fluid collecting cavity through said fluid outlet, wherein said inner surrounding wall is formed as a hollow conical shape such that said inner receiving cavity has a cross sectional area gradually reducing towards a peak thereof, wherein said fluid outlet is formed at said peak of said inner surrounding wall, wherein said outer surrounding wall has a height higher than a height of said inner surrounding wall in such a manner that when said fluid outlet is moved slightly below said surface level of said less dense fluid for allowing said less dense fluid flowing through said fluid outlet, a top edge of said outer surrounding wall is positioned above said surface level of said less dense fluid, so that said outer surrounding is capable of retaining said less dense fluid within said fluid collecting cavity; and a substance guide mounted underneath said container body at a bottom opening of said inner receiving cavity, wherein said substance guide has a plurality of guiding meshes sized for allowing said high and low dense fluids flowing into said inner receiving cavity and blocking substances floating on said high and low dense fluids entering into said inner receiving cavity, wherein said substance guide further comprises a plurality of prongs extended downwardly for pressing said substances floating on said high and low dense fluids so as to block said substances sticking on said guiding meshes;

thereby, when a downward force is applied on said floating wing until said fluid outlet is slightly positioned below a surface level of said less dense fluid, said less dense fluid is allowed to flow into said fluid collecting cavity through said fluid outlet by gravity.

2. A fluid filter for separating a less dense fluid from a high dense fluid while said less dense fluid floats on said high dense fluid, comprising:

at least a fluid filtering arrangement comprising a floating wing adapted for floating on said less dense fluid, and having at least a fluid outlet formed on said floating wing;

a container body, which is extended from said floating wing, having a fluid collecting cavity communicating with said fluid outlet, wherein said fluid outlet is formed at a peak of said fluid collecting cavity, wherein said container body comprises an outer surrounding wall and an inner surrounding wall, having an inner receiving cavity, integrally extended from said outer surrounding wall at a bottom edge thereof to form said fluid collecting cavity therebetween, wherein said floating wing is extended from an upper end portion of said inner surrounding wall such that said fluid collecting cavity is communicated with said inner receiving cavity through said fluid outlet for allowing said less dense fluid within said inner receiving cavity flowing into sad fluid collecting cavity through said fluid outlet, wherein said inner surrounding wall is formed as a hollow conical shape such that said inner receiving cavity has a cross sectional area gradually reducing towards a peak thereof, wherein said fluid outlet is formed at said peak of said inner surrounding wall, wherein said outer surrounding wall has a height higher than a height of said inner surrounding wall in such a manner that when said fluid outlet is moved slightly below said surface level of said less dense fluid for allowing said less dense fluid flowing through said fluid outlet, a top edge of said outer surrounding wall is positioned above said surface level of said less dense fluid, so that said outer surrounding is capable of retaining said less dense fluid within said fluid collecting cavity and;

a control member upwardly extended from said container body to control a downward movement of said floating wing, so as to adjust a position of said fluid outlet with respect to said surface level of said less dense fluid, wherein said control member comprises a retractable arm having a lower control portion extended from said outer surrounding wall of said container body and an upper hanging portion adapted for hanging on an top opening edge of a fluid container at a position that said floating wing floats on said less dense fluid, and means for slidably driving said hanging portion of said retractable arm along said top opening edge of said fluid container so as to move said floating wing on said less dense fluid;

thereby, when a downward force is applied on said floating wing until said fluid outlet is slightly positioned below a surface level of said less dense fluid, said less dense fluid is allowed to flow into said fluid collecting cavity through said fluid outlet by gravity.

3. A fluid filter for separating a less dense fluid from a high dense fluid while said less dense fluid floats on said high dense fluid, comprising:

at least a fluid filtering arrangement comprising a floating wing adapted for floating on said less dense fluid, and having at least a fluid outlet formed on said floating wing;

a container body, which is extended from said floating wing, having a fluid collecting cavity communicating with said fluid outlet, wherein said fluid outlet is formed at a peak of said fluid collecting cavity, wherein said container body comprises an outer surrounding wall and an inner surrounding wall, having an inner receiving cavity, integrally extended from said outer surrounding wall at a bottom edge thereof to form said fluid collecting cavity therebetween, wherein said floating wing is extended from an upper end portion of said inner surrounding wall such that said fluid collecting cavity is communicated with said inner receiving cavity through said fluid outlet for allowing said less dense fluid within said inner receiving cavity flowing into sad fluid collecting cavity through said fluid outlet; and a fluid guider extended from said outer surrounding wall to a position underneath said container body to form a fluid guiding channel, having a fluid entrance, between said fluid guider and a bottom side of said container body to communicate with said inner receiving cavity, thereby when said floating wing floats on said less dense fluid, said less dense fluid and said high dense fluid are guided to flow into said inner receiving cavity from said fluid entrance through said fluid guiding channel;

thereby, when a downward force is applied on said floating wing until said fluid outlet is slightly positioned below a surface level of said less dense fluid, said less dense fluid is allowed to flow into said fluid collecting cavity through said fluid outlet by gravity.

4. The fluid filter, as recited in claim 3, wherein said inner surrounding wall is formed as a hollow conical shape such that said inner receiving cavity has a cross sectional area gradually reducing towards a peak thereof, wherein said fluid outlet is formed at said peak of said inner surrounding wall.

5. The fluid filter, as recited in claim 4, wherein said outer surrounding wall has a height higher than a height of said inner surrounding wall in such a manner that when said fluid outlet is moved slightly below said surface level of said less dense fluid for allowing said less dense fluid flowing through said fluid outlet, a top edge of said outer surrounding wall is positioned above said surface level of said less dense fluid, so that said outer surrounding is capable of retaining said less dense fluid within said fluid collecting cavity.

6. The fluid filter, as recited in claim 5, wherein said fluid guider further has a fluid exit provided thereon for communicating with said guiding channel, wherein said fluid exit is adapted for allowing said low dense fluid exiting from said guiding channel to outside so as to balance a flow of said lower dense fluid within said guiding channel.

7. The fluid filter, as recited in claim 6, wherein said fluid guider further comprises a plurality of guiding fins spacedly and downwardly extended from said bottom side of said container body for guiding and stabilizing said high and low dense fluids flowing towards said inner receiving cavity through said guiding channel.

8. The fluid filter, as recited in claim 7, further comprises a control member upwardly extended from said outer surrounding wall of said container body to control a downward movement of said floating wing for guiding said less dense fluid flowing to said fluid collecting cavity through said fluid outlet and to control a forward movement of said container body for guiding said less dense fluid, and said high dense fluid flowing into said fluid guiding channel through said fluid entrance.

9. The fluid filter, as recited in claim 6, further comprises a control member upwardly extended from said outer surrounding wall of said container body to control a downward movement of said floating wing for guiding said less dense fluid flowing to said fluid collecting cavity through said fluid outlet and to control a forward movement of said container body for guiding said less dense fluid and said high dense fluid flowing into said fluid guiding channel through said fluid entrance.

10. The fluid filter, as recited in claim 3, wherein said fluid guider further has a fluid exit provided thereon for communicating with said guiding channel, wherein said fluid exit is adapted for allowing said low dense fluid exiting from said guiding channel to outside so as to balance a flow of said lower dense fluid within said guiding channel.

11. The fluid filter, as recited in claim 3, wherein said fluid guider further comprises a plurality of guiding fins spacedly and downwardly extended from said bottom side of said container body for guiding and stabilizing said high and low dense fluids flowing towards said inner receiving cavity through said guiding channel.

12. The fluid filter, as recited in claim 3, further comprises a control member upwardly extended from said outer surrounding wall of said container body to control a downward movement of said floating wing for guiding said less dense fluid flowing to said fluid collecting cavity through said fluid outlet and to control a forward movement of said container body for guiding said less dense fluid and said high dense fluid flowing into said fluid guiding channel through said fluid entrance.

* * * * *